(12) United States Patent
Fan et al.

(10) Patent No.: US 9,432,148 B2
(45) Date of Patent: *Aug. 30, 2016

(54) UPLINK COVERAGE VIA AUTONOMOUS RETRANSMISSION

(71) Applicant: Telefonaktiebolaget L M Ericsson (publ), Stockholm (SE)

(72) Inventors: Rui Fan, Beijing (CN); Xinyu Gu, Beijing (CN); Rong Hu, Sollentuna (SE); Jinhua Liu, Beijing (CN); Zhang Zhang, Beijing (CN)

(73) Assignee: Telefonaktiebolaget LM Ericsson (publ), Stockholm (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/842,995

(22) Filed: Sep. 2, 2015

(65) Prior Publication Data

US 2015/0372789 A1 Dec. 24, 2015

Related U.S. Application Data

(63) Continuation of application No. 13/788,377, filed on Mar. 7, 2013, now Pat. No. 9,143,958, which is a continuation of application No. 12/988,419, filed as application No. PCT/SE2008/051394 on Dec. 2, 2008, now Pat. No. 8,413,003.

(60) Provisional application No. 61/050,370, filed on May 5, 2008.

(51) Int. Cl.
*H04L 12/28* (2006.01)
*H04W 72/00* (2009.01)
(Continued)

(52) U.S. Cl.
CPC .............. *H04L 1/1829* (2013.01); *H04L 1/189* (2013.01); *H04L 1/1812* (2013.01); *H04L 1/1825* (2013.01); *H04W 24/02* (2013.01); *H04W 24/08* (2013.01)

(58) Field of Classification Search
None
See application file for complete search history.

(56) References Cited

U.S. PATENT DOCUMENTS

| 8,090,323 B2 | 1/2012 | Craig et al. |
| 2005/0249164 A1 | 11/2005 | Kwak et al. |

(Continued)

FOREIGN PATENT DOCUMENTS

| CN | 1954533 | 4/2007 |
| EP | 1 833 189 | 9/2007 |

(Continued)

OTHER PUBLICATIONS

International Search Report for PCT/SE2008/051394, mailed May 4, 2009.

(Continued)

*Primary Examiner* — Edan Orgad
*Assistant Examiner* — Sithu Ko
(74) *Attorney, Agent, or Firm* — Baker Botts, LLP

(57) ABSTRACT

A device (110) receives consecutive negative acknowledgments (NACKs) (540), measures a downlink channel quality (530) associated with the device (110), and triggers autonomous retransmission (430) when power is limited in the device (110), when the device (110) is using a minimum usable enhanced dedicated channel (E-DCH) transport format combination (ETFC), and when one of a number of consecutive NACKs (540) is greater than a predefined number or the measured downlink channel quality (530) is less than a predefined threshold.

14 Claims, 16 Drawing Sheets

(51) Int. Cl.
  *H04L 1/18*   (2006.01)
  *H04W 24/02*  (2009.01)
  *H04W 24/08*  (2009.01)

(56) References Cited

U.S. PATENT DOCUMENTS

| | | |
|---|---|---|
| 2007/0121569 A1 | 5/2007 | Fukui et al. |
| 2007/0248051 A1 | 10/2007 | Nagaraj et al. |
| 2007/0248091 A1* | 10/2007 | Khalid ............... H04L 63/0272 370/392 |
| 2009/0258666 A1* | 10/2009 | Pelletier ............ H04W 74/0833 455/522 |

FOREIGN PATENT DOCUMENTS

| | | |
|---|---|---|
| EP | 2 067 294 | 4/2008 |
| JP | 2006-109155 | 4/2006 |
| JP | 2007-324700 | 12/2007 |
| WO | 2005/109729 | 11/2005 |
| WO | 2005109729 | 11/2005 |
| WO | 2008/054274 | 5/2008 |
| WO | 2009/088345 | 7/2009 |
| WO | 2009/096845 | 8/2009 |
| WO | 2009/131509 | 10/2009 |

OTHER PUBLICATIONS

International Preliminary Report on Patentability with 5 Amended sheets.
European Office Action issued in Application No. 08 874 223.4 dated Jul. 30, 2012.
Chinese Office Action issued in Application No. 200880128971.7 dated Sep. 29, 2012 with English Translation.
Japanese Office Action issue in Application No. 2011-507368 dated Feb. 22, 2013.

* cited by examiner

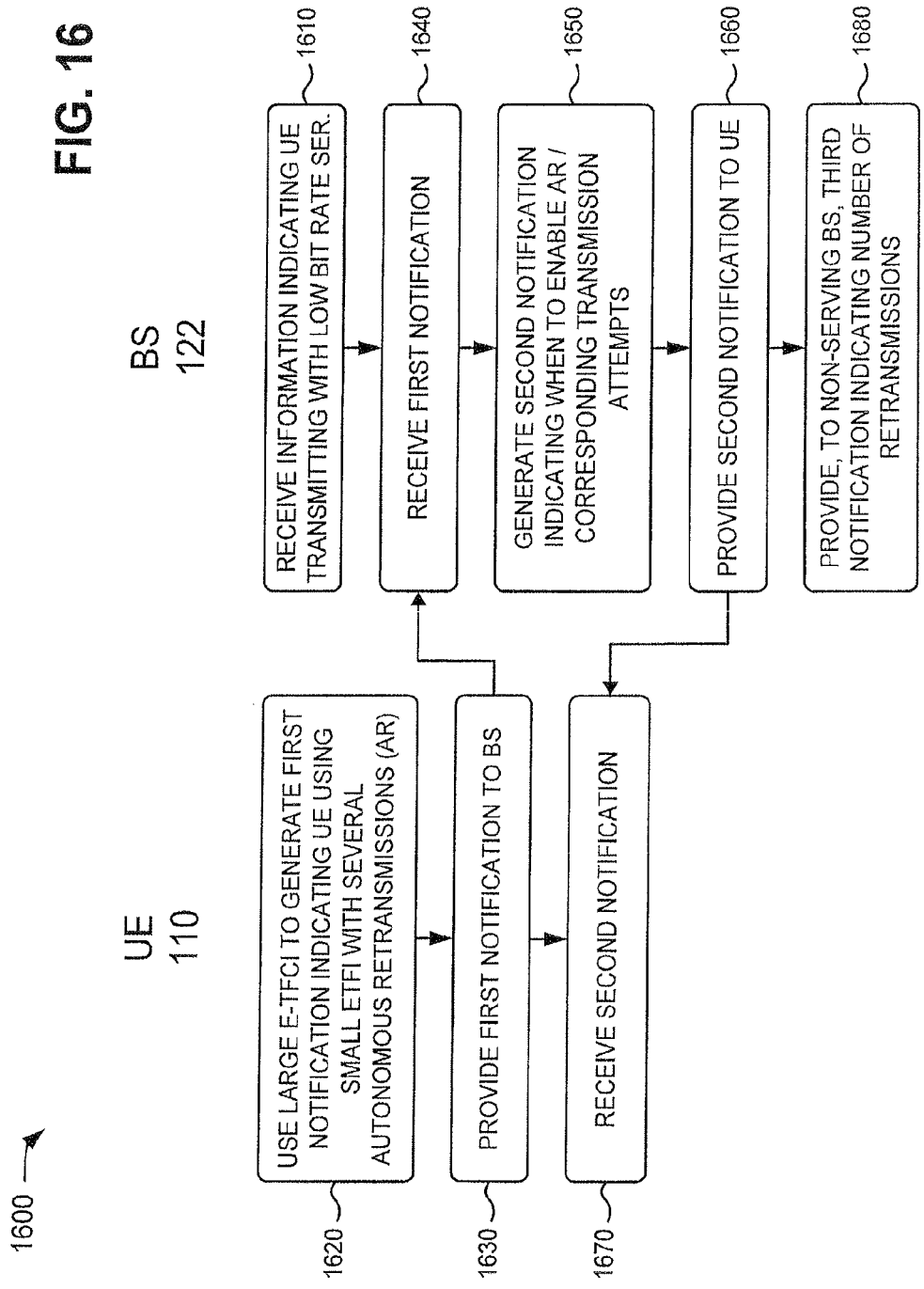

UPLINK COVERAGE VIA AUTONOMOUS RETRANSMISSION

PRIORITY

This application is a continuation, under 35 U.S.C. §120, of U.S. application Ser. No. 13/788,377 filed Mar. 7, 2013, which is a continuation, under 35 U.S.C. §120, of U.S. application Ser. No. 12/988,419 filed Oct. 18, 2010, now U.S. Patent No. 8,413,003, which is a national stage filing under 35 U.S.C. §371 of International Patent Application Serial No. PCT/SE08/51394 filed Dec. 2, 2008, and entitled "UPLINK COVERAGE VIA AUTONOMOUS RE-TRANSMISSION" which claims priority to U.S. Provisional Patent Application No. 61/050,370 filed May 5, 2008, all of which are hereby incorporated by reference in their entirety.

TECHNICAL FIELD

Embodiments described herein relate generally to wireless communication systems, and more particularly, to improved uplink coverage in wireless communication systems via autonomous retransmission.

BACKGROUND

Enhanced uplink (EUL) is proposed in the Third Generation Partnership Project (3GPP) Release 6 to improve uplink performance of Wideband Code Division Multiple Access (WCDMA) systems. Two transmission time intervals (TTIs) are proposed for enhanced uplink, a ten (10) milliseconds TTI and a two (2) milliseconds TTI. The ten milliseconds TTI provides similar cell coverage as previous Universal Mobile Telecommunications System (UMTS) releases, but its cell throughput is too small. The two milliseconds TTI provides better cell throughput than the ten milliseconds TTI, but its cell coverage is insufficient.

One technique that improves enhanced uplink coverage is hybrid automatic repeat request (HARQ) retransmission. According to current 3GPP specifications, enhanced uplink HARQ retransmission can occur only after expiration of a round trip time (RTT). Since the RTT for the two milliseconds TTI is sixteen (16) milliseconds and three (3) retransmissions may be required to guarantee reliable reception of a packet, a retransmission delay of forty-eight (48) milliseconds could be introduced by enhanced uplink HARQ. Such a delay may not be acceptable for some delay sensitive services (e.g., voice over Internet protocol (VoIP) services, etc.).

Autonomous retransmission has been proposed as an effective way to reduce such HARQ retransmission delay. A core concept of autonomous retransmission is that user equipment (UE) sends a number of retransmissions consecutively, without waiting for receipt of a negative acknowledgment (NACK) before starting the next retransmission. However, if three retransmissions are required, autonomous retransmission may only reduce the retransmission delay to six (6) milliseconds. Some autonomous retransmission techniques describe how a receiver knows that a bundle of transmissions are designated for a single packet, how the receiver decodes the packets transmitted with autonomous retransmission correctly, how to apply autonomous retransmission in high-speed downlink packet access (HSDPA), how to use autonomous retransmission for extended coverage, how to apply autonomous retransmission to notify a non-serving Node B, etc.

Although autonomous retransmission is an effective way to improve uplink coverage, it still suffers from several drawbacks. For example, if autonomous retransmission is applied with an excessively large number of transmission attempts or at an inappropriate time, autonomous retransmission will generate unnecessary interference in a system. On the other hand, autonomous retransmission with less (or an inadequate number of) transmission attempts can not take full advantage of the benefits of the technique.

SUMMARY

It is an object of the invention to overcome at least some of the above disadvantages and to trigger autonomous retransmission at an appropriate time and with an appropriate number of HARQ retransmissions.

Embodiments described herein may apply autonomous retransmission techniques to improve enhanced uplink coverage for systems (e.g., WCDMA systems providing two milliseconds TTIs). In one embodiment, for example, user equipment (UE) may receive condition information, may receive communicated information from a base station (BS), and may generate an appropriate number of retransmissions and an appropriate timing for the retransmissions based on the received information. The appropriate number of retransmissions and the appropriate timing for the retransmissions may ensure that enhanced uplink coverage is improved.

In an exemplary embodiment, the condition information may include power usage in the user equipment, whether the user equipment is using a minimum usable enhanced dedicated channel (E-DCH) transport format combination (ETFC), a measured downlink channel quality, whether a number of consecutive NACKs are received by the user equipment, etc. The user equipment may trigger autonomous retransmission when power in the user equipment is limited, when the user equipment is using a minimum usable ETFC, and when one of the measured downlink channel quality is less than a predefined threshold or the number of consecutive NACKs received by the user equipment is greater than a predefined number. The user equipment may determine the appropriate number of retransmissions based on a measured power clipping associated with the user equipment.

In another exemplary embodiment, the user equipment may estimate a data signal-to-interference ratio (SIR) (also known as a carrier-to-interference ratio (CIR)) associated with a channel, and may determine whether a difference between the estimated data SIR and a SIR for a transport format is greater than a certain decibel level. The user equipment may trigger autonomous retransmission when power in the user equipment is limited, when the user equipment is using a minimum usable ETFC, and when the difference is greater than the certain decibel level.

In still another exemplary embodiment, the condition information may include an estimate of the SIR in the base station, positive acknowledgments (ACKs) received by the user equipment, NACKs received by the user equipment, etc. The user equipment may determine the appropriate number of retransmissions, may increase the number of retransmissions when a certain number of consecutive NACKs are received, and may decrease the number of retransmissions when a certain number of consecutive ACKs are received.

In a further exemplary embodiment, the base station may determine a required SIR for a transport format, may measure a current SIR associated with the base station, and may calculate the number of retransmissions based on the required SIR and the current SIR. The base station may provide the calculated number of retransmissions to the user equipment (e.g., as the communicated information), and the user equipment may generate the calculated number of retransmissions when power in the user equipment is limited and when the user equipment is using a minimum usable ETFC.

Such an arrangement may ensure that autonomous retransmission is triggered at an appropriate time and with an appropriate number of HARQ retransmissions. This may reduce unnecessary interference generated by autonomous retransmission (e.g., such as occurs when the number of autonomous retransmissions are excessively large or not necessary), may reduce packet transmission delay, and may improve cell coverage for delay sensitive services.

BRIEF DESCRIPTION OF THE DRAWINGS

FIGS. 10-16 depict flow charts of exemplary processes according to embodiments described herein.

DETAILED DESCRIPTION

The following detailed description refers to the accompanying drawings. The same reference numbers in different drawings may identify the same or similar elements. Also, the following detailed description does not limit the invention.

Embodiments described herein may apply autonomous retransmission techniques to improve enhanced uplink coverage for systems (e.g., WCDMA systems providing two milliseconds TTIs). The autonomous retransmission techniques described herein may be used to generate an appropriate number of retransmissions and an appropriate timing for the retransmissions, and may ensure that enhanced uplink coverage is improved.

Figure 1:
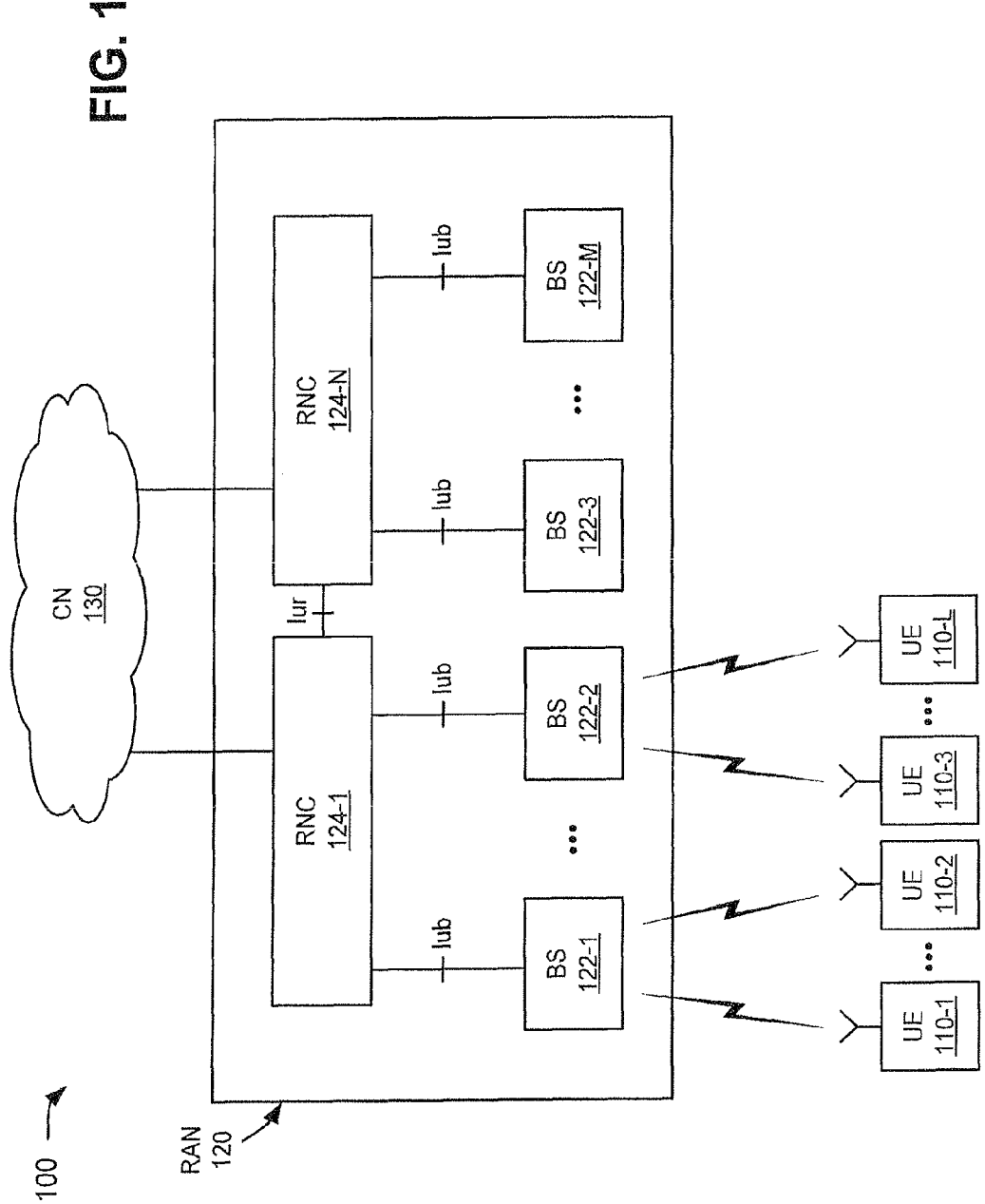
FIG. 1 depicts a diagram of an exemplary network in which systems and/or methods described herein may be implemented.

FIG. 1 depicts a diagram of an exemplary network 100 in which systems and/or methods described herein may be implemented. As shown, network 100 may include a group of user equipment (UE) 110-1 through 110-L (referred to collectively, and in some instances individually, as "user equipment 110"), a radio access network (RAN) 120, and a core network (CN) 130. Four pieces of user equipment 110, a single radio access network 120, and a single core network 130 have been illustrated in FIG. 1 for simplicity. In practice, there may be more UEs 110, random access networks 120, and/or core networks 130. Also, in some instances, a component in network 100 (e.g., one or more of user equipment 110, radio access network 120, and core network 130) may perform one or more functions described as being performed by another component or group of components in network 100.

User equipment 110 may include one or more devices capable of sending/receiving voice and/or data to/from radio access network 120. In one embodiment, user equipment 110 may include, for example, a wireless telephone, a personal digital assistant (PDA), a laptop computer, etc. In another embodiment, user equipment 110 may receive condition information (e.g., as described in further detail below), may receive communicated information (e.g., as described in further detail below) from base station 122, and may generate an appropriate number of retransmissions and an appropriate timing for the retransmissions based on the received information. The appropriate number of retransmissions and the appropriate timing for the retransmissions may ensure that enhanced uplink coverage is improved.

Radio access network 120 may include one or more devices for transmitting voice and/or data to user equipment 110 and core network 130. As illustrated, radio access network 120 may include a group of base stations (BSs) 122-1 through 122-M (referred to collectively as "base stations 122" and in some instances, individually as "base station 122") and a group of radio network controllers (RNCs) 124-1 through 124-N (referred to collectively as "radio network controllers 124" and in some instances, individually as "radio network controller 124"). Four base stations 122 and two radio network controllers 124 are shown in FIG. 1 for simplicity. In practice, there may be more or fewer base stations 122 and/or radio network controllers 124. Also, in some instances, a component in radio access network 120 (e.g., one or more of base stations 122 and radio network controllers 124) may perform one or more functions described as being performed by another component or group of components in radio access network 120.

Base stations 122 (also referred to as "Node Bs") may include one or more devices that receive voice and/or data from radio network controllers 124 and transmit that voice and/or data to user equipment 110 via an air interface. Base stations 122 may also include one or more devices that receive voice and/or data from user equipment 110 over an air interface and transmit that voice and/or data to radio network controllers 124 or other user equipment 110.

In one embodiment, base station 122 may detect (or estimate) a data SIR associated with a channel, and may determine whether a difference between the detected (or estimated) data SIR and a SIR for a transport format is greater than a certain decibel level. Base station 122 may provide the determination of the difference to user equipment 110 (e.g., as the communicated information), and user equipment 110 may trigger autonomous retransmission when power in the user equipment is limited, when the user equipment is using a minimum usable ETFC, and when the difference is greater than the certain decibel level.

In another embodiment, base station 122 may determine a required SIR for a transport format, may measure a current SIR associated with base station 122, and may calculate a number of retransmissions based on the required SIR and the current SIR. Base station 122 may provide the calculated number of retransmissions to user equipment 110 (e.g., as the communicated information), and user equipment 110 may generate the calculated number of retransmissions.

Radio network controllers 124 may include one or more devices that control and manage base stations 122. Radio network controllers 124 may also include devices that perform data processing to manage utilization of radio network services. Radio network controllers 124 may transmit/receive voice and data to/from base stations 122, other radio network controllers 124, and/or core network 130.

A radio network controller 124 may act as a controlling radio network controller (CRNC), a drift radio network controller (DRNC), or a serving radio network controller (SRNC). A CRNC may be responsible for controlling the resources of a base station 122. On the other hand, an SRNC may serve particular user equipment 110 and may manage connections towards that user equipment 110. Likewise, a DRNC may fulfill a similar role to the SRNC (e.g., may route traffic between a SRNC and particular user equipment 110).

As illustrated in FIG. 1, a radio network controller 124 may connect to a base station 122 via an Iub interface and to another radio network controller 124 via an Iur interface.

Core network 130 may include one or more devices that transfer/receive voice and/or data to a circuit-switched and/or packet-switched network. In one embodiment, core network 130 may include, for example, a Mobile Switching Center (MSC), a Gateway MSC (GMSC), a Media Gateway (MGW), a Serving General Packet Radio Service (GPRS) Support Node (SGSN), a Gateway GPRS Support Node (GGSN), and/or other devices.

Figure 2:
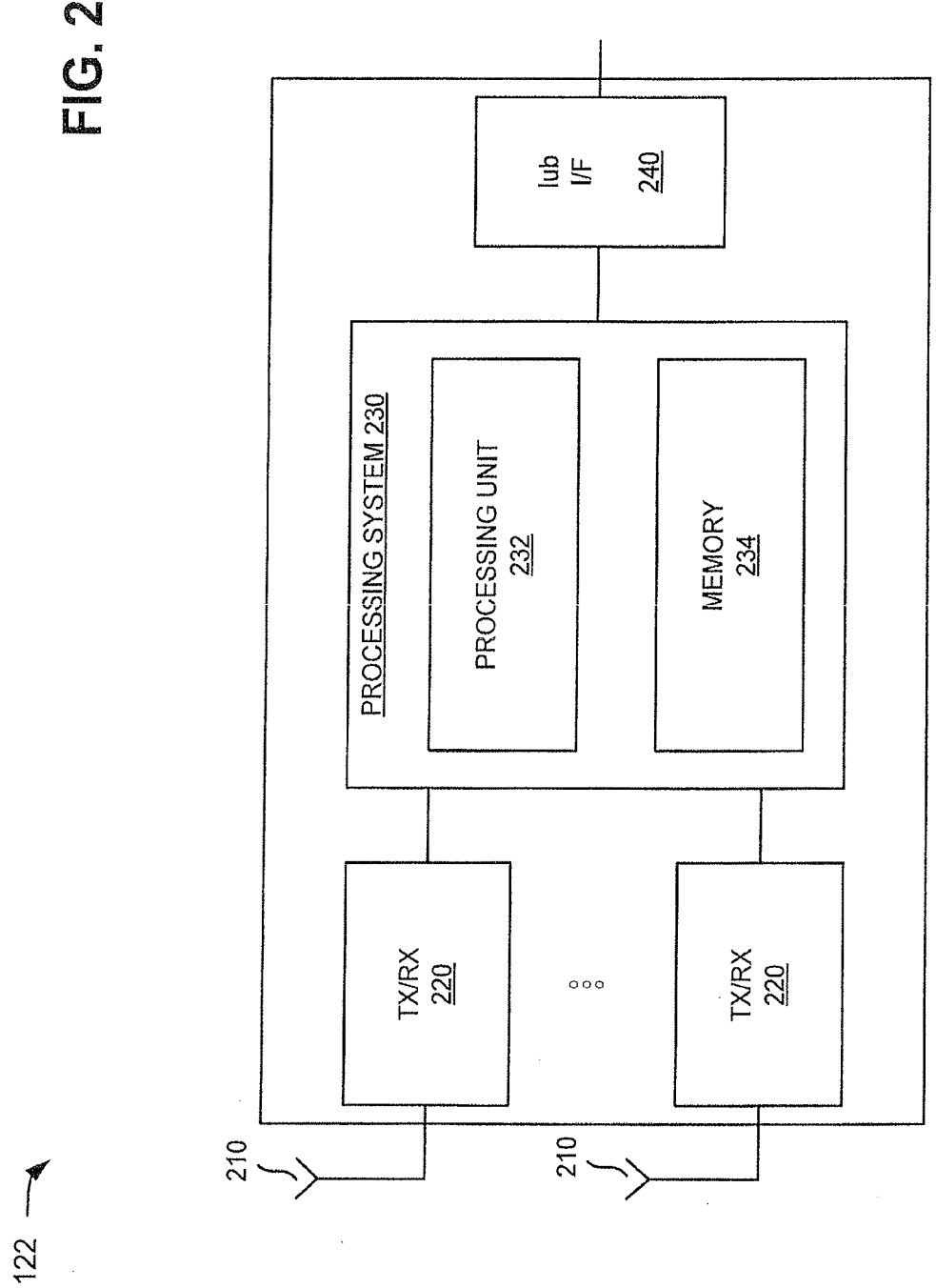
FIG. 2 illustrates a diagram of exemplary components of a base station depicted FIG. 1.

FIG. 2 illustrates a diagram of exemplary components of base station 122. As shown in FIG. 2, base station 122 may include antennas 210, transceivers (TX/RX) 220, a processing system 230, and an Iub interface (I/F) 240.

Antennas 210 may include one or more directional and/or omni-directional antennas. Transceivers 220 may be associated with antennas 210 and may include transceiver circuitry for transmitting and/or receiving symbol sequences in a network, such as network 110, via antennas 210.

Processing system 230 may control the operation of base station 122. Processing system 230 may also process information received via transceivers 220 and Iub interface 240. Processing system 230 may further measure quality and strength of connection, may determine the frame error rate (FER), and may transmit this information to radio network controller 124. As illustrated, processing system 230 may include a processing unit 232 and a memory 234.

Processing unit 232 may include a processor, a microprocessor, an application specific integrated circuit (ASIC), a field programmable gate array (FPGA), or the like. Processing unit 232 may process information received via transceivers 220 and Iub interface 240. The processing may include, for example, data conversion, forward error correction (FEC), rate adaptation, Wideband Code Division Multiple Access (WCDMA) spreading/dispreading, quadrature phase shift keying (QPSK) modulation, etc. In addition, processing unit 232 may generate control messages and/or data messages, and may cause those control messages and/or data messages to be transmitted via transceivers 220 and/or Iub interface 240. Processing unit 232 may also process control messages and/or data messages received from transceivers 220 and/or Iub interface 240.

Memory 234 may include a random access memory (RAM), a read-only memory (ROM), and/or another type of memory to store data and instructions that may be used by processing unit 232.

Iub interface 240 may include one or more line cards that allow base station 122 to transmit data to and receive data from a radio network controller 124.

As described herein, base station 122 may perform certain operations in response to processing unit 232 executing software instructions of an application contained in a computer-readable medium, such as memory 234. A computer-readable medium may be defined as a physical or logical memory device. The software instructions may be read into memory 234 from another computer-readable medium or from another device via antennas 210 and transceivers 220. The software instructions contained in memory may cause processing unit 232 to perform processes described herein. Alternatively, hardwired circuitry may be used in place of or in combination with software instructions to implement processes described herein. Thus, embodiments described herein are not limited to any specific combination of hardware circuitry and software.

Although FIG. 2 shows exemplary components of base station 122, in other embodiments, base station 122 may contain fewer, different, or additional components than depicted in FIG. 2. In still other embodiments, one or more components of base station 122 may perform one or more other tasks described as being performed by one or more other components of base station 122.

Figure 3:
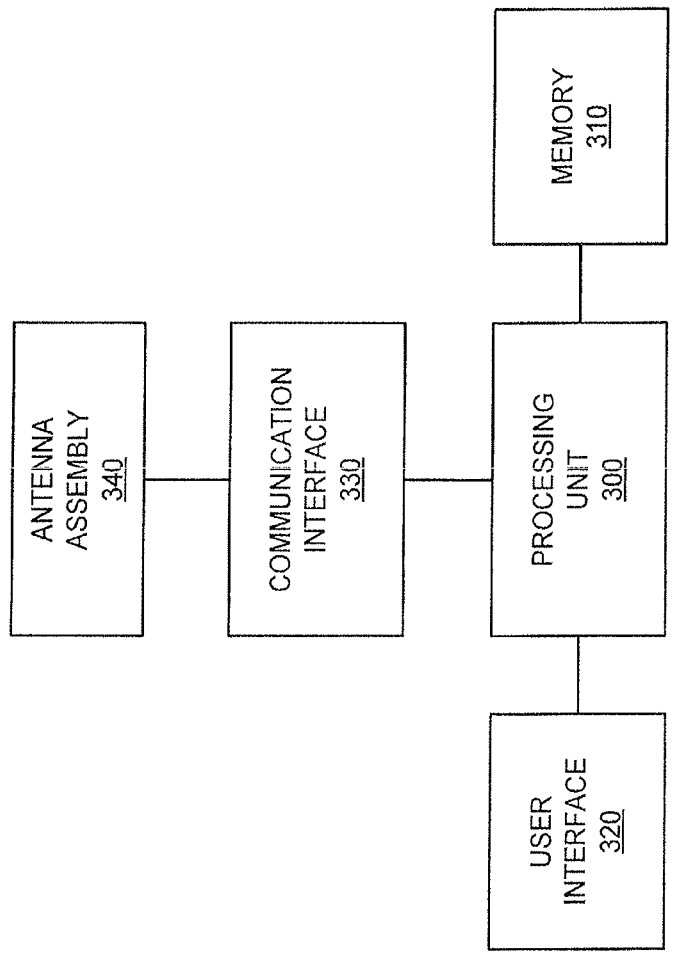
FIG. 3 depicts a diagram of exemplary components of user equipment illustrated in FIG. 1.

FIG. 3 depicts a diagram of exemplary components of user equipment 110. As shown in FIG. 3, user equipment 110 may include a processing unit 300, a memory 310, a user interface 320, a communication interface 330, and/or an antenna assembly 340.

Processing unit 300 may include a processor, a microprocessor, an ASIC, a FPGA, or the like. Processing unit 300 may control operation of user equipment 110 and its components. In one embodiment, processing unit 300 may control operation of components of user equipment 110 in a manner described herein.

Memory 310 may include a RAM, a ROM, and/or another type of memory to store data and instructions that may be used by processing unit 300.

User interface 320 may include mechanisms for inputting information to user equipment 110 and/or for outputting information from user equipment 110.

Communication interface 330 may include, for example, a transmitter that may convert baseband signals from processing unit 300 to radio frequency (RF) signals and/or a receiver that may convert RF signals to baseband signals. Alternatively, communication interface 330 may include a transceiver to perform functions of both a transmitter and a receiver. Communication interface 330 may connect to antenna assembly 340 for transmission and/or reception of the RF signals.

Antenna assembly 340 may include one or more antennas to transmit and/or receive signals through a radio interface. Antenna assembly 340 may, for example, receive RF signals from communication interface 330 and transmit them through the radio interface, and receive RF signals through the radio interface and provide them to communication interface 330. In one embodiment, for example, communication interface 330 may communicate with a network (e.g., network 100) and/or devices connected to a network.

As described herein, user equipment 110 may perform certain operations in response to processing unit 300 executing software instructions of an application contained in a computer-readable medium, such as memory 310. The software instructions may be read into memory 310 from another computer-readable medium or from another device via communication interface 330. The software instructions contained in memory 310 may cause processing unit 300 to perform processes described herein. Alternatively, hardwired circuitry may be used in place of or in combination with software instructions to implement processes described herein. Thus, embodiments described herein are not limited to any specific combination of hardware circuitry and software.

Although FIG. 3 shows exemplary components of user equipment 110, in other embodiments, user equipment 110 may contain fewer, different, or additional components than depicted in FIG. 3. In still other embodiments, one or more components of user equipment 110 may perform one or more other tasks described as being performed by one or more other components of user equipment 110.

Figure 4:
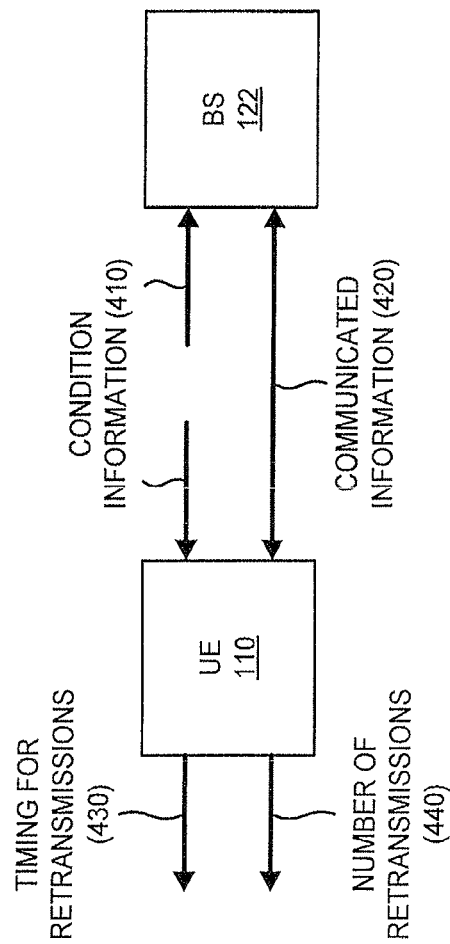
FIG. 4 depicts a diagram of exemplary interactions among the user equipment and the base station illustrated in FIG. 1.

FIG. 4 depicts a diagram of exemplary interactions among user equipment 110 and base station 122. User equipment 110 and base station 122 may include the features described above in connection with, for example, FIGS. 1-3.

As shown in FIG. 4, user equipment 110 and base station 122 may receive (and/or determine) condition information 410. Condition information 410 may include power usage in user equipment 110, whether user equipment 110 is using a minimum usable ETFC, a measured downlink channel quality, whether a number of consecutive NACKs are received by user equipment 110, measured power clipping in user equipment 110, an estimate of the SIR in base station 122, positive acknowledgments (ACKs) received by user equipment 110, NACKs received by user equipment 110, etc.

As further shown in FIG. 4, user equipment 110 and base station 122 may exchange communicated information 420 among each other. Communicated information 420 may include a determination (e.g., by base station 122) of a difference between a detected (or estimated) data SIR and a SIR for a transport format, a calculated number of retransmissions based on a required SIR for a transport format and a current SIR associated with base station 122, etc.

User equipment 110 may utilize condition information 410 and/or communicated information 420 to determine timing for retransmissions 430 (e.g., an appropriate time to trigger autonomous retransmission) and a number of retransmissions 440 (e.g., HARQ retransmission attempts for autonomous retransmission).

In one exemplary embodiment, user equipment 110 may trigger autonomous retransmission (e.g., timing for retransmissions 430) when power in user equipment 110 is limited, when user equipment 110 is using a minimum usable ETFC, and when either the measured downlink channel quality is less than a predefined threshold or the number of consecutive NACKs received by user equipment 110 is greater than a predefined number. In another exemplary embodiment, user equipment 110 may trigger autonomous retransmission (e.g., timing for retransmissions 430) when power in user equipment 110 is limited, when user equipment 110 is using a minimum usable ETFC, and when a difference between a detected (or estimated) data SIR and a SIR for a transport format is determined to be greater than a certain decibel level (e.g., three decibels).

In one exemplary embodiment, user equipment 110 may determine a number of retransmissions 440, may increase number of retransmissions 440 when a certain number of consecutive NACKs are received, and may decrease number of retransmissions 440 when a certain number of consecutive ACKs are received. In another exemplary embodiment, base station 122 may determine a required SIR for a transport format, may measure a current SIR associated with base station 122, and may calculate number of retransmissions 440 based on the required SIR and the current SIR. Base station 122 may provide the calculated number of retransmissions 440 to user equipment 110 (e.g., as communicated information 420), and user equipment 110 may generate number of retransmissions 440.

Although FIG. 4 shows exemplary interactions between user equipment 110 and base station 122, in other embodiments, user equipment 110 and base station 122 may perform fewer, different, or additional interactions than depicted in FIG. 4.

Figure 5:
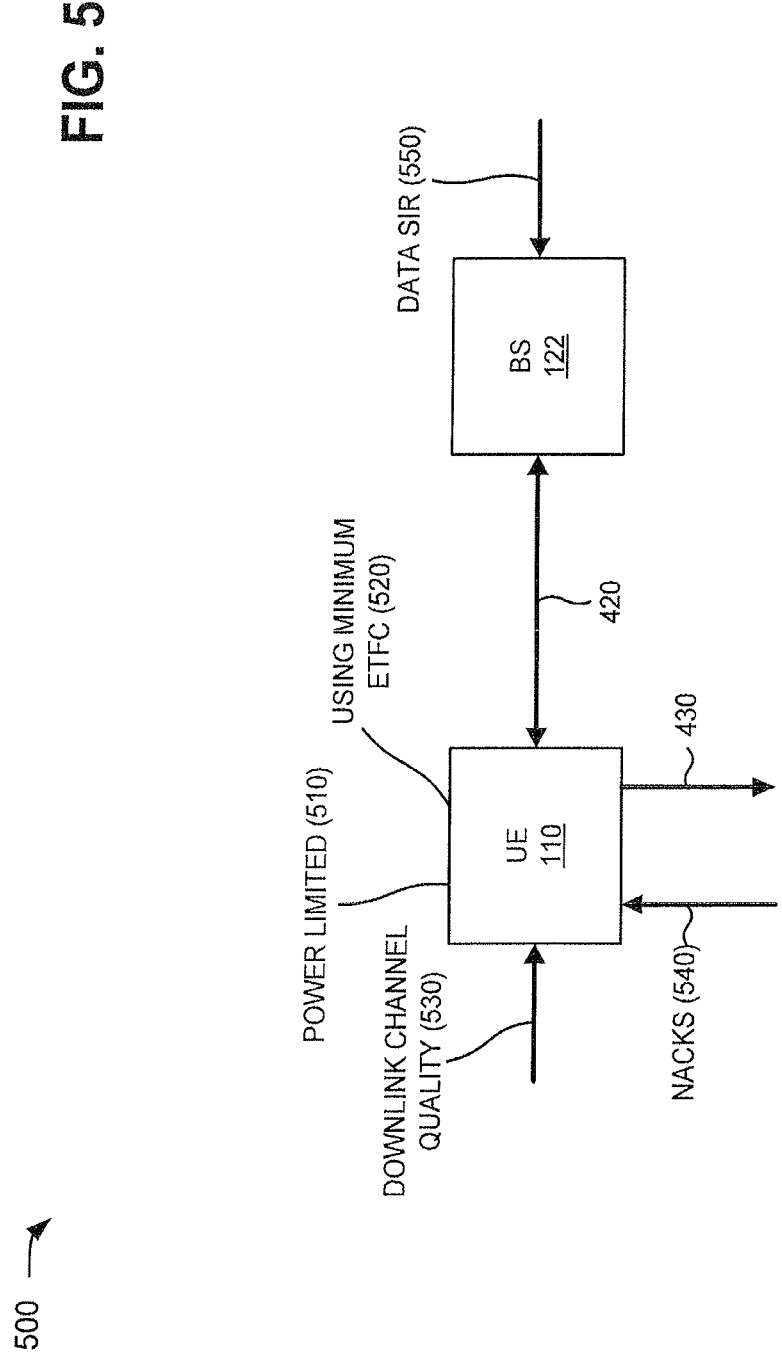
FIG. 5 illustrates another diagram of exemplary interactions among the user equipment and the base station depicted in FIG. 1.

FIG. 5 illustrates another diagram of exemplary interactions among user equipment 110 and base station 122. User equipment 110 and base station 122 may include the features described above in connection with, for example, FIGS. 1-3.

As shown in FIG. 5, user equipment 110 may determine whether it is power limited 510, and may determine whether it is using a minimum usable ETFC 520. User equipment 110 may measure a downlink channel quality 530 and may receive one or more NACKs 540. Downlink channel quality 530 may include a quality (e.g., a common pilot channel (CPICH) committed information rate (CIR) or a channel quality indicator (CIQ)) associated with a downlink channel. User equipment 110 may determine whether a number of consecutive NACKs 540 is greater than a predefined number, and whether downlink channel quality 530 is lower than a predefined threshold. In one exemplary embodiment, if user equipment 110 is power limited 510, user equipment 110 is using a minimum usable ETFC 520, and either the number of consecutive NACKs 540 is greater than the predefined number or downlink channel quality 530 is lower than the predefined threshold, user equipment 110 may trigger autonomous retransmission (e.g., timing for retransmissions 430).

As further shown in FIG. 5, base station 122 may receive (or estimate) a data SIR 550, and may provide data SIR 550 to user equipment 110 (e.g., via communicated information 420). User equipment 110 may determine whether a difference between data SIR 550 and a required SIR for transport format associated with the base station 122 is greater than a certain decibel level (e.g., three decibels). In one exemplary embodiment, if user equipment 110 is power limited 510, user equipment 110 is using a minimum usable ETFC 520, and the difference between data SIR 550 and a required SIR for a transport format associated with base station 122 is greater than a certain decibel level, user equipment 110 may trigger autonomous retransmission (e.g., timing for retransmissions 430).

Although FIG. 5 shows exemplary interactions between user equipment 110 and base station 122, in other embodiments, user equipment 110 and base station 122 may perform fewer, different, or additional interactions than depicted in FIG. 5.

Figure 6:
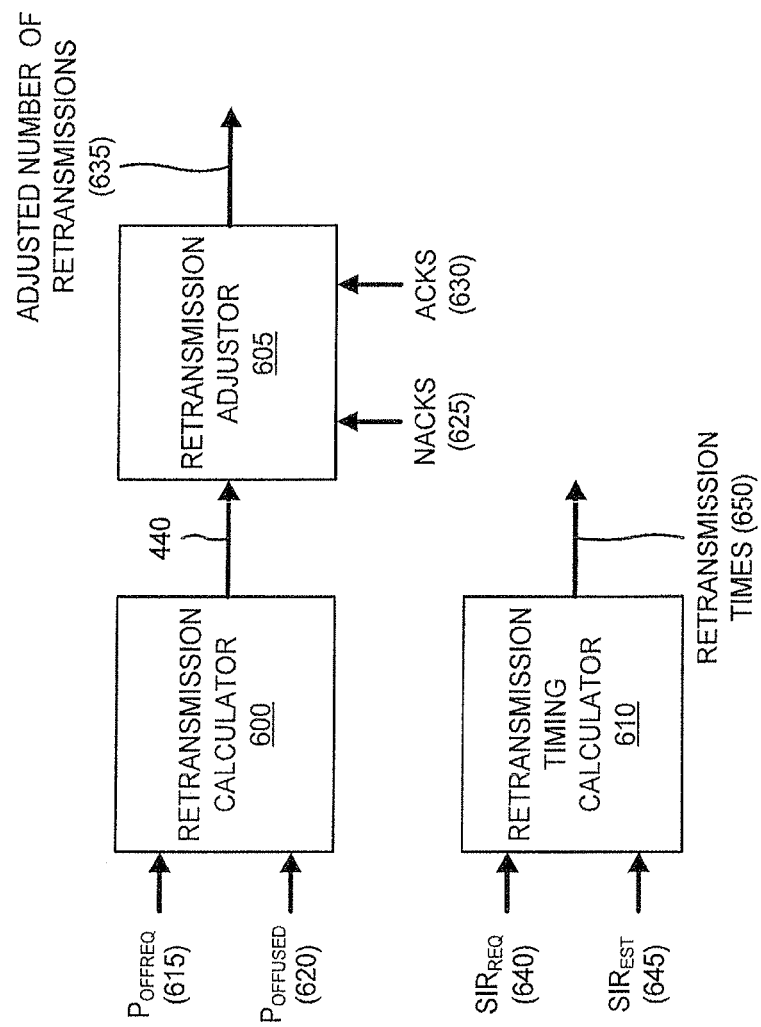
FIGS. 6 and 7 depict diagrams of exemplary functional components of the user equipment illustrated in FIG. 3.

FIG. 6 depicts a diagram of exemplary functional components of user equipment 110. As shown, user equipment 110 may include a retransmission calculator 600, a retransmission adjuster 605, and a retransmission timing calculator 610. In one embodiment, the functions described in connection with FIG. 6 may be performed by processing unit 300 (FIG. 3).

Retransmission calculator 600 may include any hardware, software, or combination of hardware and software that may calculate number of retransmissions 440. In one embodiment, retransmission calculator 600 may receive a required power offset ($P_{OFFREQ}$) 615 for a transport format, may receive an actually used power offset ($P_{OFFUSED}$) 620 for the transport format, and may calculate number of retransmissions 440 based on $P_{OFFREQ}$ 615 and $P_{OFFUSED}$ 620. In one exemplary embodiment, retransmission calculator 600 may calculate number of retransmissions 440 based on the following:

$$\text{floor}(\text{db2lin}(P_{OFFREQ} - P_{OFFUSED})),$$

where "db2lin" may convert decibels to a linear scale (e.g., 0 decibels=1.0) and "floor" may determine a greatest integer less than or equal to an input value. Retransmission calculator 600 may provide number of retransmissions 440 to retransmission adjuster 605.

Retransmission adjuster 605 may include any hardware, software, or combination of hardware and software that may receive number of retransmissions 440 from retransmission calculator 600, may receive NACKs 625 and/or ACKs 630 (e.g., received by user equipment 110), and may adjust number of retransmissions 440 based on NACKs 625 or ACKs 630. In one exemplary embodiment, retransmission adjuster 605 may increase number of retransmissions 440 (e.g., by a value of one) when a certain number of consecutive NACKs 625 are received (e.g., by user equipment 110). In another exemplary embodiment, retransmission adjuster 605 may decrease number of retransmissions 440 (e.g., by a value of one) when a certain number of consecutive ACKs 630 are received (e.g., by user equipment 110).

Retransmission timing calculator 610 may include any hardware, software, or combination of hardware and software that may receive a SIR ($SIR_{REQ}$) 640 required for the transport format, may receive an estimate of a SIR ($SIR_{EST}$) 645 associated with base station 122, and may calculate retransmission times 650 (e.g., timing for autonomous retransmission) based on $SIR_{REQ}$ 640 and $SIR_{EST}$ 645. In one exemplary embodiment, retransmission timing calculator 610 may calculate retransmission times 650 based on the following:

$$\text{floor}(\text{db2lin}(SIR_{REQ} - SIR_{EST})),$$

where "db2lin" may convert decibels to a linear scale (e.g., 0 decibels=1.0) and "floor" may determine a greatest integer less than or equal to an input value.

Although FIG. 6 shows exemplary functional components of user equipment 110, in other embodiments, user equipment 110 may contain fewer, different, or additional functional components than depicted in FIG. 6. In still other embodiments, one or more functional components of user equipment 110 may perform one or more other tasks described as being performed by one or more other functional components of user equipment 110.

Figure 7:
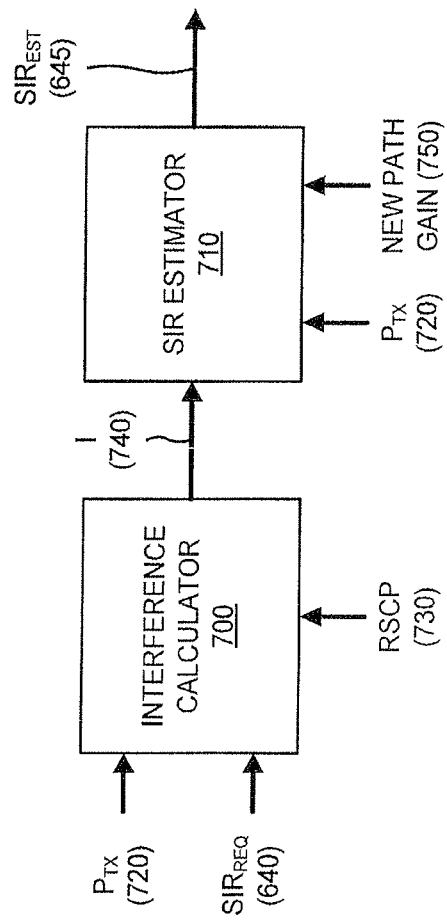

FIG. 7 depicts a diagram of exemplary functional components of user equipment 110 that may be used to calculate $SIR_{EST}$ 645. As shown in FIG. 7, user equipment 110 may include an interference calculator 700 and a SIR estimator 710. In one embodiment, the functions described in connection with FIG. 7 may be performed by processing unit 300 (FIG. 3).

Interference calculator 700 may include any hardware, software, or combination of hardware and software that may receive a transmission power ($P_{TX}$) 720 of a common pilot channel (CPICH), may receive a received signal code power (RSCP) 730 of the CPICH, and may receive $SIR_{REQ}$ 640. Interference calculator 700 may measure a path gain (pathgain) to base station 122 based on $P_{TX}$ 720 and RSCP 730. In one exemplary embodiment, when user equipment 110 chooses ETFC in a minimum ETFC set, interference calculator 700 may estimate an interference (I) 740 at base station 122, when ACKs are received, according to the following:

$$I = \frac{pathgain \cdot P_{TX}}{SIR_{REQ}}.$$

Interference calculator 700 may provide interference 740 to SIR estimator 710.

SIR estimator 710 may include any hardware, software, or combination of hardware and software that may receive interference 740 from interference calculator 700, may receive transmission power ($P_{TX}$) 720, and may receive a new measured path gain ($pathgain_{new}$) 750. In one exemplary embodiment, SIR estimator 710 may assume that a total interference is constant in a short period of time, and may calculate $SIR_{EST}$ 645 in base station 122 according to the following:

$$SIR_{EST} = \frac{pathgain_{new} \cdot P_{TX}}{I}.$$

Although FIG. 7 shows exemplary functional components of user equipment 110, in other embodiments, user equipment 110 may contain fewer, different, or additional functional components than depicted in FIG. 7. In still other embodiments, one or more functional components of user equipment 110 may perform one or more other tasks described as being performed by one or more other functional components of user equipment 110.

Figure 8:
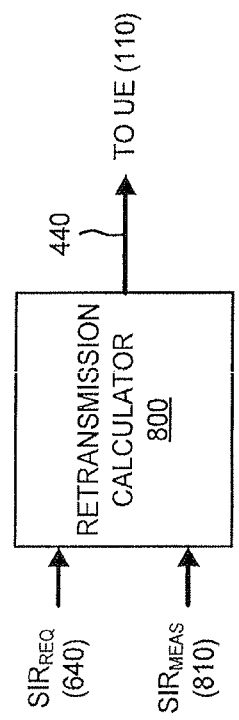
FIG. 8 illustrates a diagram of an exemplary functional component of the base station depicted in FIG. 2.

FIG. 8 illustrates a diagram of an exemplary functional component of base station 122. As shown, base station 122 may include a retransmission calculator 800. In one embodiment, the functions described in connection with FIG. 8 may be performed by processing unit 232 (FIG. 2).

Retransmission calculator 800 may include any hardware, software, or combination of hardware and software that may receive $SIR_{REQ}$ 640 required for the transport format, may receive a SIR ($SIR_{MEAS}$) 810 measured in base station 122, and may calculate number of retransmissions 440 based on $SIR_{REQ}$ 640 and $SIR_{MEAS}$ 810. In one exemplary embodiment, retransmission calculator 800 may calculate number of retransmissions 440 based on the following:

$$\text{floor}(\text{db2lin}(SIR_{REQ} - SIR_{MEAS})),$$

where "db2lin" may convert decibels to a linear scale (e.g., 0 decibels=1.0) and "floor" may determine a greatest integer less than or equal to an input value. Retransmission calculator 800 may provide number of retransmissions 440 to user equipment 110 (e.g., via communicated information 420). User equipment 110 may generate the number of retransmissions 440 when power in user equipment 110 is limited and when user equipment 110 is using a minimum usable ETFC.

Although FIG. 8 shows an exemplary functional component of base station 122, in other embodiments, base station 122 may contain different or additional functional components than depicted in FIG. 8.

Figure 9:
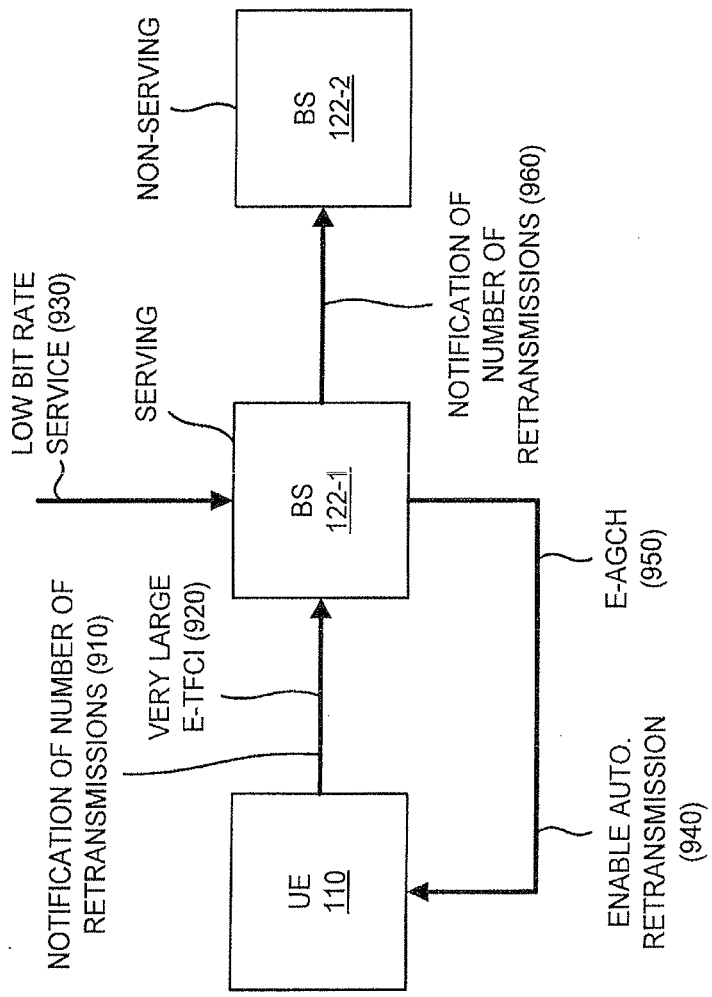
FIG. 9 depicts a diagram of exemplary interactions among the user equipment and two base stations illustrated in FIG. 1.

FIG. 9 depicts a diagram of exemplary interactions among user equipment 110, base station 122-1 (e.g., a serving base station of user equipment 110), and base station 122-2 (e.g., a non-serving base station of user equipment 110). User equipment 110, base station 122-1, and base station 122-2 may include the features described above in connection with, for example, FIGS. 1-3.

It may be necessary for user equipment 110 to notify a base station (e.g., base station 122-1) about a number of autonomous retransmissions so that base station 122-1 may decode packets correctly. As shown in FIG. 9, if user equipment 110 is using a low bit rate service (e.g., VoIP) and since it may be impossible for a low bit rate service to use very large ETFC, user equipment 110 may provide, to base station 122-1, a notification 910 of the number of retransmissions via a very large E-DCH transport format combination indicator (E-TFCI) 920. Notification 910 may inform base station 122-1 that user equipment 110 is using a small E-DCH transport format indicator (ETFI) and several autonomous retransmissions. Base station 122-1 may know that user equipment 110 is transmitting with a low bit rate service 930 via a RNC (e.g., RNC 124-1).

As further shown in FIG. 9, in order to provide communicated information 420 from base station 122-1 to user equipment 110, base station 122-1 may suggest to user equipment 110 as to when to enable autonomous retransmission (and may suggest a corresponding number of retransmission attempts), as indicated by reference number 940. In one embodiment, base station 122-1 may convey enable autonomous retransmission 940 to user equipment 110 via an E-DCH absolute grant channel (E-AGCH), as indicated by reference number 950. A very large absolute grant (AG) may be used to represent the times of retransmission attempts without confusing user equipment 110 because user equipment 110 may be power-limited and may use a minimum set ETFC. User equipment 110 may not expect to receive very large absolute grants.

As also shown in FIG. 9, since AG may be sent from serving base station 122-1 to user equipment 110 and non-serving base station 122-2 may not be aware of this, base station 122-1 may provide a notification 960 of a number of retransmissions (for autonomous retransmission) to non-serving base station 122-2. In one embodiment, base station 122-1 may convey notification 960 to user equipment 110 via an E-AGCH.

Although FIG. 9 shows exemplary interactions between user equipment 110, base station 122-1, and base station 122-2, in other embodiments, user equipment 110, base station 122-1, and base station 122-2 may perform fewer, different, or additional interactions than depicted in FIG. 9.

Figure 10:
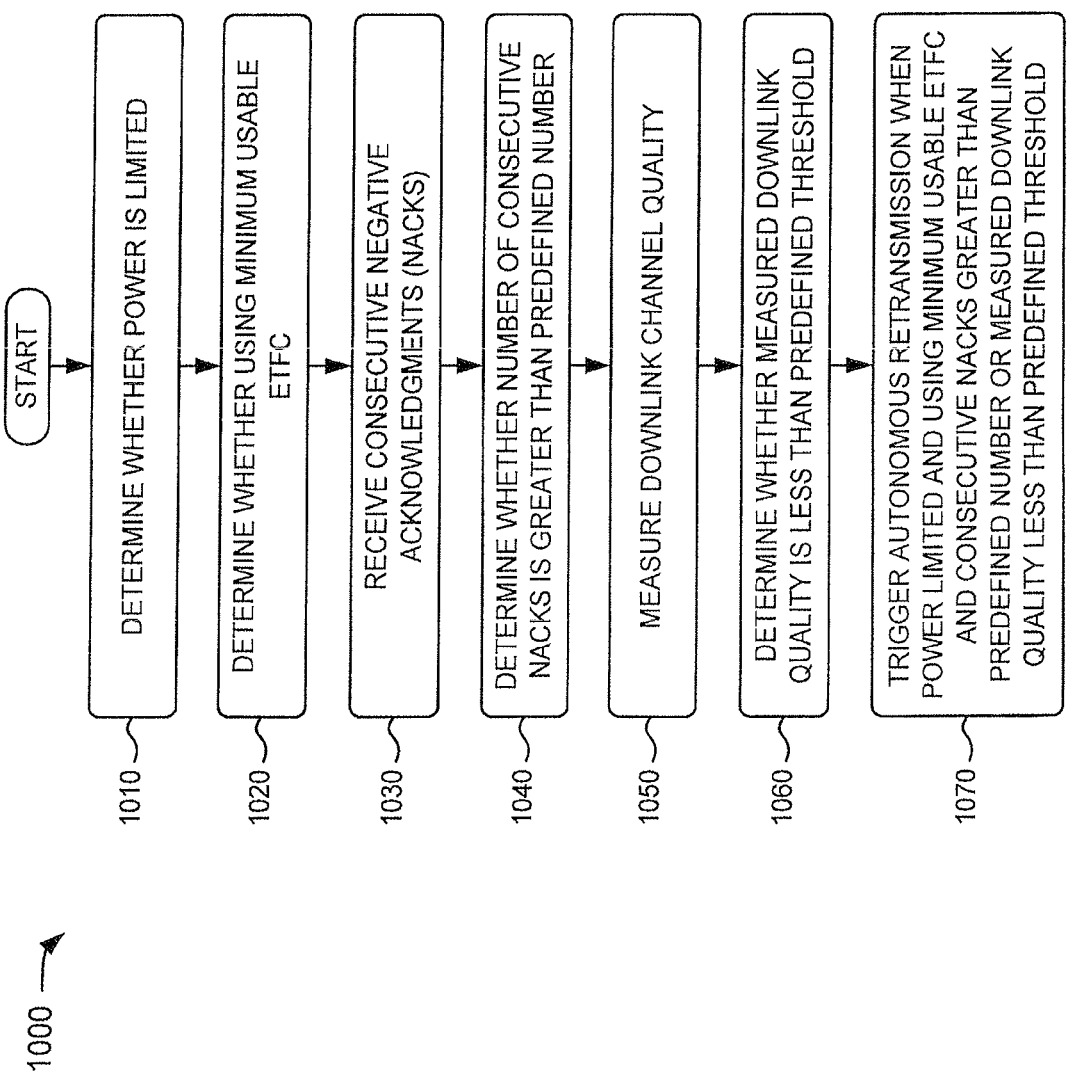

FIG. 10 illustrates a flow chart of an exemplary process 1000 for determining when to trigger autonomous retransmission according to embodiments described herein. In one embodiment, process 1000 may be performed by user equipment 110. In other embodiments, some or all of process 1000 may be performed by user equipment 110 in combination with another device or group of devices (e.g., communicating with user equipment 110).

As illustrated in FIG. 10, process 1000 may include determining whether power is limited in user equipment (block 1010), determining whether the user equipment is using a minimum usable ETFC (block 1020), receiving consecutive negative acknowledgments (NACKs) (block 1030), determining whether a number of consecutive NACKs is greater than a predefined number (block 1040), measuring downlink channel quality (block 1050), and determining whether the measured downlink channel quality is less than a predefined threshold (block 1060). For example, in embodiments described above in connection with FIG. 4, user equipment 110 may receive (and/or determine) condition information 410. Condition information 410 may include power usage in user equipment 110, whether user equipment 110 is using a minimum usable ETFC, a measured downlink channel quality, and whether a number of consecutive NACKs are received by user equipment 110.

Returning to FIG. 10, autonomous retransmission may be triggered when the user equipment is power limited, when the user equipment is using the minimum usable ETFC, and when one of the number of consecutive NACKs is greater than the predefined number or the measured downlink channel quality is less than the predefined threshold (block 1070). For example, in embodiments described above in connection with FIG. 4, user equipment 110 may utilize condition information 410 to determine timing for retransmissions 430 (e.g., an appropriate time to trigger autonomous retransmission). In one example, user equipment 110 may trigger autonomous retransmission (e.g., timing for retransmissions 430) when power in user equipment 110 is limited, when user equipment 110 is using a minimum usable ETFC, and when either the measured downlink channel quality is less than a predefined threshold or the number of consecutive NACKs received by user equipment 110 is greater than a predefined number.

Figure 11:
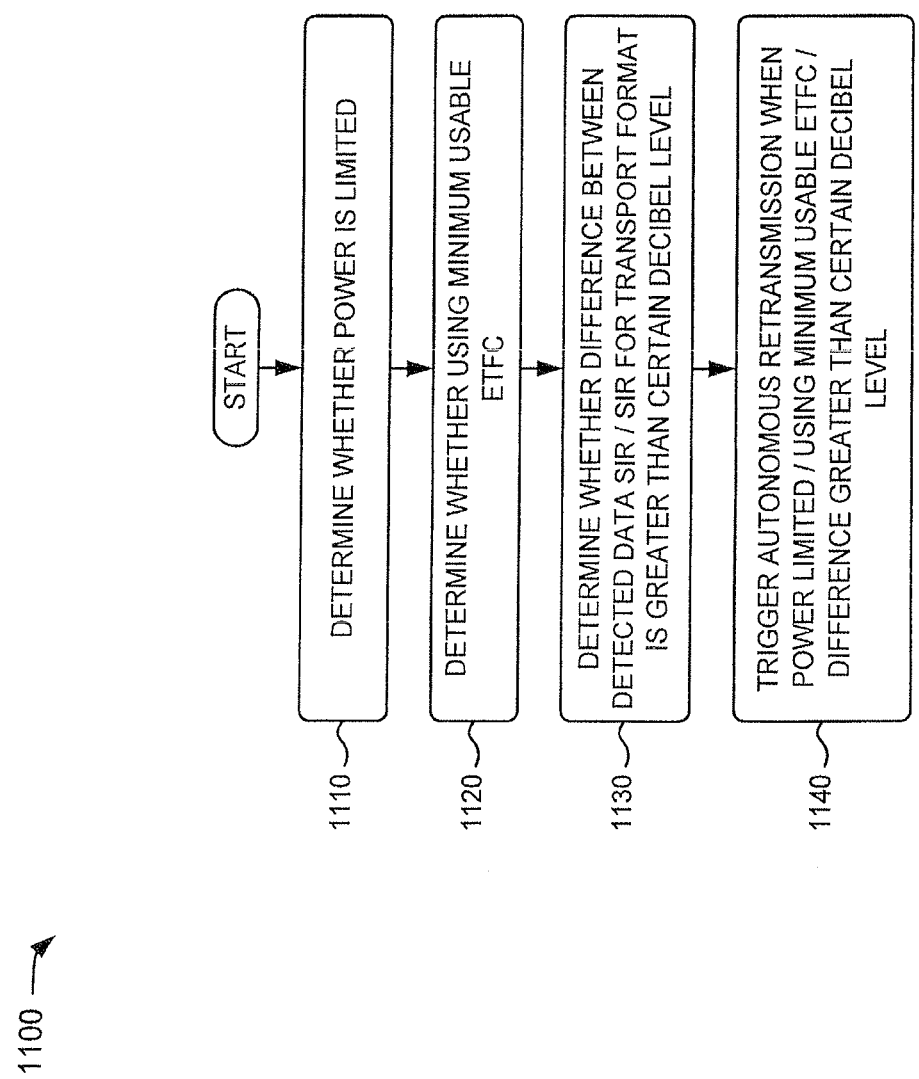

FIG. 11 illustrates a flow chart of another exemplary process 1100 for determining when to trigger autonomous retransmission according to embodiments described herein. In one embodiment, process 1100 may be performed by user equipment 110. In other embodiments, some or all of process 1100 may be performed by user equipment 110 in combination with another device (e.g., base station 122) or group of devices (e.g., communicating with user equipment 110).

As illustrated in FIG. 11, process 1100 may include determining whether power is limited in user equipment (block 1110), and determining of whether the user equipment is using a minimum usable ETFC (block 1120). For example, in embodiments described above in connection with FIG. 4, user equipment 110 may receive (and/or determine) condition information 410. Condition information 410 may include power usage in user equipment 110, and whether user equipment 110 is using a minimum usable ETFC.

As further shown in FIG. 11, it may be determined whether a difference between a detected (or estimated) data SIR at a base station and a SIR for a transport format is greater than a certain decibel level may be received from the base station (block 1130), and autonomous retransmission may be triggered when the user equipment is power limited, when the user equipment is using the minimum usable ETFC, and when the difference is greater than the certain decibel level (block 1040). For example, in embodiments described above in connection with FIG. 5, user equipment 110 may determine whether a difference between data SIR 550 and a required SIR for a transport format associated with base station 122 is greater than a certain decibel level (e.g., three decibels). In one example, if user equipment 110 is power limited 510, user equipment 110 is using a minimum usable ETFC 520, and the difference between data SIR 550 and a required SIR for a transport format associated with base station 122 is greater than a certain decibel level, user equipment 110 may trigger autonomous retransmission (e.g., timing 30 for retransmissions 430).

Figure 12:
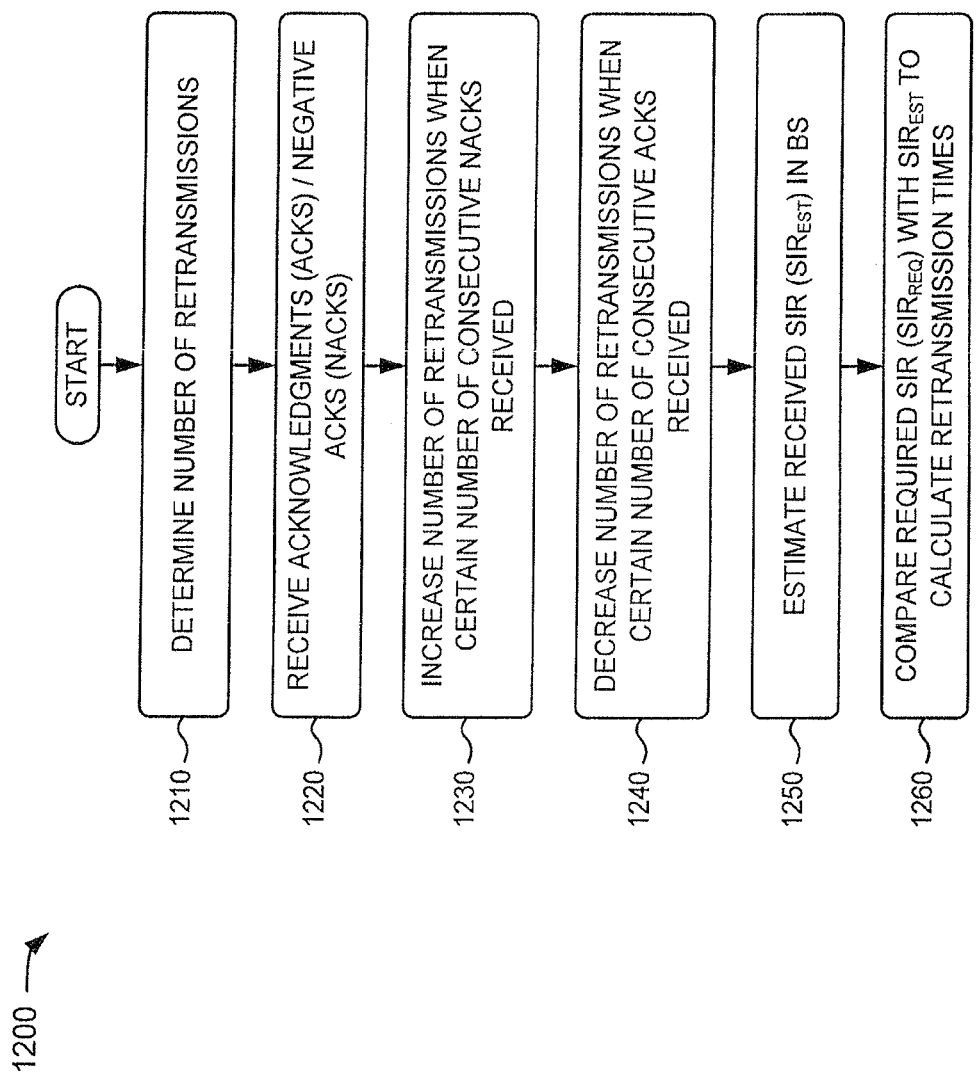

FIG. 12 illustrates a flow chart of an exemplary process 1200 for determining a number of retransmissions for autonomous retransmission according to embodiments described herein. In one embodiment, process 1200 may be performed by user equipment 110. In other embodiments, some or all of process 1100 may be performed by user equipment 110 in combination with another device (e.g., base station 122) or group of devices (e.g., communicating with user equipment 110).

As illustrated in FIG. 12, process 1200 may include determining a number of retransmissions (block 1210). For example, in embodiments described above in connection with FIG. 6, user equipment 110 may include retransmission calculator 600. Retransmission calculator 600 may calculate number of retransmissions 440. In one example, retransmission calculator 600 may receive required power offset ($P_{OFFREQ}$) 615 for a transport format, and may receive actually used power offset ($P_{OFFUSED}$) 620 for the transport format. Retransmission calculator 600 may calculate number of retransmissions 440 based on $P_{OFFREQ}$ 615 and $P_{OFFUSED}$ 620.

As further shown in FIG. 12, positive acknowledgements (ACKs) and/or negative acknowledgements (NACKs) may be received (block 1220), the number of retransmissions may be increased when a certain number of consecutive NACKs are received (block 1230), and/or the number of retransmissions may be decreased when a certain number of consecutive ACKs are received (block 1240). For example, in embodiments described above in connection with FIG. 6, user equipment 110 may include retransmission adjuster 605. Retransmission adjuster 605 may receive number of retransmissions 440 from retransmission calculator 600, may receive NACKs 625 and/or ACKs 630 (e.g., received by user equipment 110), and may adjust number of retransmissions 440 based on NACKs 625 or ACKs 630. In one example, retransmission adjuster 605 may increase number of retransmissions 440 (e.g., by a value of one) when a certain number of consecutive NACKs 625 are received (e.g., by user equipment 110). In another example, retransmission adjuster 605 may decrease number of retransmissions 440 (e.g., by a value of one) when a certain number of consecutive ACKs 630 are received (e.g., by user equipment 110).

Returning to FIG. 12, a received SIR in a base station may be estimated (block 1250), and the estimated SIR may be compared with a required SIR in the base station to calculate retransmission times for autonomous retransmission (block 1260). For example, in embodiments described above in connection with FIG. 6, user equipment 110 may include retransmission timing calculator 610. Retransmission timing calculator 610 may receive SIR ($SIR_{REQ}$) 640 required for the transport format, may receive estimate of a SIR ($SIR_{EST}$) 645 associated with base station 122, and may calculate retransmission times 650 (e.g., timing for autonomous retransmission) based on $SIR_{REQ}$ 640 and $SIR_{EST}$ 645. In one example, when a number of autonomous retransmissions is adjusted adaptively based on a number of consecutive NACKs (e.g., consecutive NACKs 625) and/or consecutive ACKs (e.g., consecutive ACKs 630) received, estimation of the received SIR may not be needed, and process blocks 1250 and 1260 may be omitted.

Figure 13:
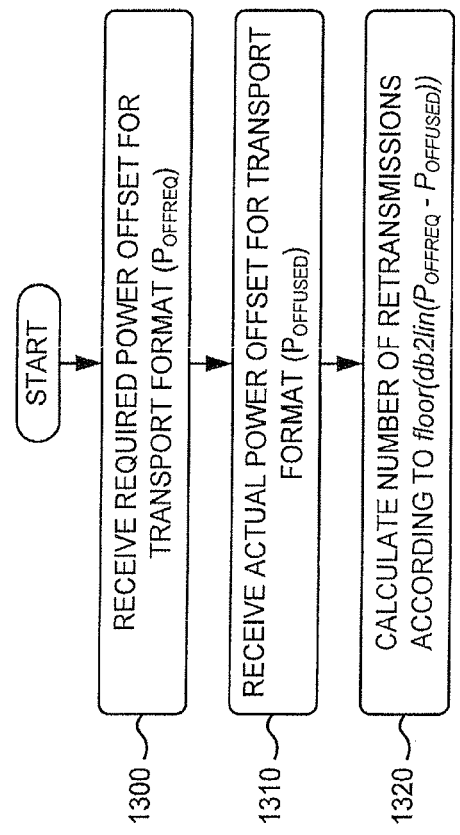

Process block 1210 may include the process blocks depicted in FIG. 13. As shown in FIG. 13, process block 1210 may include receiving (or obtaining) a required power offset ($P_{OFFREQ}$) for a transport format (block 1300), receiving (or obtaining) an actually used power offset ($P_{OFFUSED}$) for the transport format (block 1310), and calculating the number of retransmissions according to floor(db2lin($P_{OFFREQ}-P_{OFFUSED}$)) (block 1320). For example, in embodiments described above in connection with FIG. 6, retransmission calculator 600 may receive required power offset ($P_{OFFREQ}$) 615 for a transport format, may receive actually used power offset ($P_{OFFUSED}$) 620 for the transport format, and may calculate number of retransmissions 440 based on the following:

floor(db2lin($P_{OFFREQ}-P_{OFFUSED}$)), where "db2lin" may convert decibels to a linear scale (e.g., 0 decibels=1.0) and "floor" may determine a greatest integer less than or equal to an input value.

Figure 14:
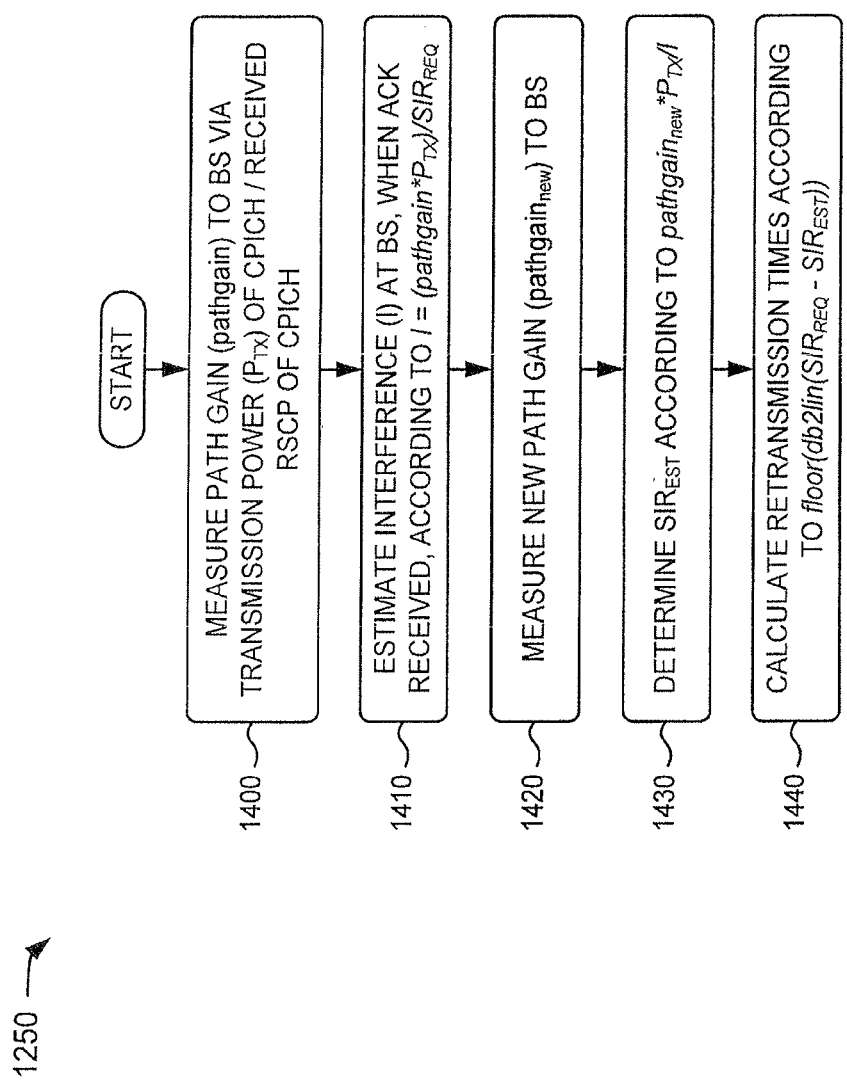

Process block 1250 may include the process blocks depicted in FIG. 14. As shown in FIG. 14, process block 1250 may include measuring a path gain (pathgain) to the base station via a transmission power ($P_{TX}$) of CPICH and a received RSCP of CPICH (block 1400), and estimating interference (I) at the base station, when an ACK is received, according to $$I = \frac{pathgain \cdot P_{TX}}{SIR_{REQ}} \text{ (block 1410)}.$$

For example, in embodiments described above in connection with FIG. 7, user equipment 110 may include interference calculator 700. Interference calculator 700 may receive transmission power ($P_{TX}$) 720 of a common pilot channel (CPICH), may receive received signal code power (RSCP) 730 of the CPICH, and may receive $SIR_{REQ}$ 640. Interference calculator 700 may measure path gain (pathgain) to base station 122 based on $P_{TX}$ 720 and RSCP 730. In one example, when user equipment 110 chooses ETFC in a minimum ETFC set, interference calculator 700 may estimate interference (I) 740 at base station 122, when ACKs are received, according to the following:

$$I = \frac{pathgain \cdot P_{TX}}{SIR_{REQ}}.$$

As further shown in FIG. 14, process block 1250 may include measuring a new path gain (pathgain$_{new}$) to the base station (block 1420), determining the estimated SIR ($SIR_{EST}$) in the base station according to $$SIR_{EST} = \frac{pathgain_{new} \cdot P_{TX}}{I} \text{ (block 1430)},$$

and calculating the retransmission times according to floor (db2lin($SIR_{REQ}-SIR_{EST}$)) (block 1440). For example, in embodiments described above in connection with FIGS. 6 and 7, user equipment 110 may include SIR estimator 710 and retransmission timing calculator 610. SIR estimator 710 may receive interference 740 from interference calculator 700, may receive transmission power ($P_{TX}$) 720, and may receive new measured path gain (pathgain$_{new}$) 750. In one example, SIR estimator 710 may assume that a total interference is constant in a short period of time, and may calculate $SIR_{EST}$ 645 in base station 122 according to the following:

$$SIR_{EST} = \frac{pathgain_{new} \cdot P_{TX}}{I}.$$

Retransmission timing calculator 610 may receive SIR ($SIR_{REQ}$) 640 required for the transport format, may receive estimate of a SIR ($SIR_{EST}$) 645 associated with base station 122, and may calculate retransmission times 650 (e.g., timing for autonomous retransmission) based on the following:

floor(db2lin($SIR_{REQ}-SIR_{EST}$)), where "db2lin" may convert decibels to a linear scale (e.g., 0 decibels=1.0) and "floor" may determine a greatest integer less than or equal to an input value.

Figure 15:
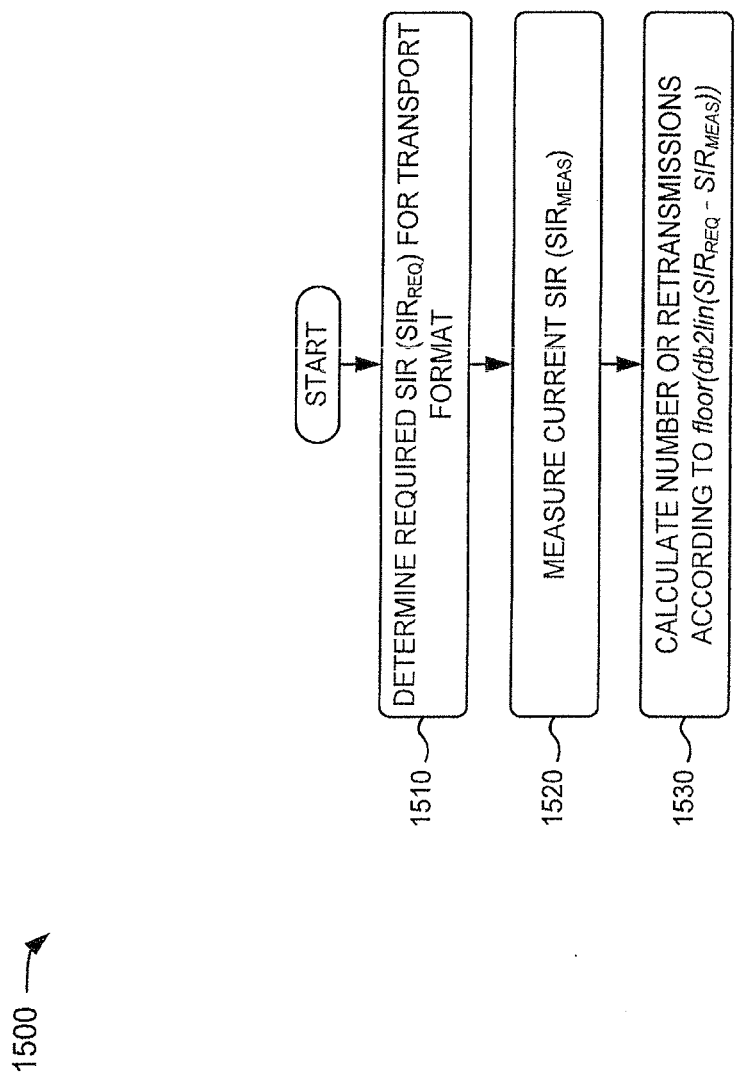

FIG. 15 illustrates a flow chart of an exemplary process 1500 for determining a number of retransmissions for autonomous retransmission according to embodiments described herein. In one embodiment, process 1500 may be performed by base station 122. In other embodiments, some or all of process 1500 may be performed by base station 122 in combination with another device (e.g., user equipment 110) or group of devices (e.g., communicating with base station 122).

As illustrated in FIG. 15, process 1500 may include determining a required SIR ($SIR_{REQ}$) for a transport format (block 1510), measuring a current SIR ($SIR_{MEAS}$) (block 1520), and calculating a number of retransmissions for autonomous retransmission according to floor(db2lin($SIR_{REQ}-SIR_{MEAS}$)) (block 1530). For example, in embodiments described above in connection with FIG. 8, base station 122 may include retransmission calculator 800. Retransmission calculator 800 may receive $SIR_{REQ}$ 640 required for the transport format, may receive SIR ($SIR_{MEAS}$) 810 measured in base station 122, and may calculate number of retransmissions 440 based on $SIR_{REQ}$ 640 and $SIR_{MEAS}$ 810. In one example, retransmission calculator 800 may calculate number of retransmissions 440 based on the following:

$$\text{floor}(\text{db2lin}(SIR_{REQ}-SIR_{MEAS})),$$

where "db2lin" may convert decibels to a linear scale (e.g., 0 decibels=1.0) and "floor" may determine a greatest integer less than or equal to an input value. Retransmission calculator 800 may provide number of retransmissions 440 to user equipment 110 (e.g., via communicated information 420). User equipment 110 may generate the number of retransmissions 440 when power in user equipment 110 is limited and when user equipment 110 is using a minimum usable ETFC.

FIG. 16 illustrates a flow chart of an exemplary process 1600 for enabling communications between user equipment 110 and base stations 122 according to embodiments described herein. In one embodiment, process 1600 may be performed by user equipment 110 and base station 122. In other embodiments, some or all of process 1600 may be performed by user equipment 110 and base station 122 in combination with another device or group of devices (e.g., communicating with user equipment 110 and base station 122).

As illustrated in FIG. 16, process 1600 may begin with receipt, by base station 122, of information indicating that user equipment is transmitting with a low bit rate service (1610), using, by user equipment 110, a large E-TFCI to generate a first notification indicating that user equipment 110 is using small ETFI with several autonomous retransmissions (block 1620), providing, by user equipment 110, the first notification to base station 122 (block 1630), and receiving, by base station 122, the first notification (block 1640). For example, in embodiments described above in connection with FIG. 9, if user equipment 110 is using a low bit rate service (e.g., VoIP) and since it may be impossible for a low bit rate service to use very large ETFC, user equipment 110 may provide, to base station 122-1, notification 910 of the number of retransmissions via very large E-DCH transport format combination indicator (E-TFCI) 920. Notification 910 may inform base station 122-1 that user equipment 110 is using a small E-DCH transport format indicator (ETFI) and several autonomous retransmissions. Base station 122-1 may know that user equipment 110 is transmitting with low bit rate service 930 via a RNC (e.g., RNC 124-1).

Returning to FIG. 16, base station 122 may generate a second notification indicating a suggestion when to enable autonomous retransmission and a suggested corresponding number of transmission attempts (block 1650), base station 122 may provide the second notification to user equipment 110 (block 1660), user equipment 110 may receive the second notification (block 1670), and base station 122 may provide, to a non-serving base station, a third notification indicating a number of retransmissions (block 1680). For example, in embodiments described above in connection with FIG. 9, in order to provide communicated information 420 from base station 122-1 to user equipment 110, base station 122-1 may suggest to user equipment 110 as to when to enable autonomous retransmission (and may suggest a corresponding number retransmission attempts), as indicated by reference number 940. Base station 122-1 may convey enable autonomous retransmission 940 to user equipment 110 via an E-DCH absolute grant channel (E-AGCH), as indicated by reference number 950. A very large absolute grant (AG) may be used to represent the times of retransmission attempts without confusing user equipment 110 because user equipment 110 may be power-limited and may use a minimum set ETFC. Since AG may be sent from serving base station 122-1 to user equipment 110 and non-serving base station 122-2 may not be aware of this, base station 122-1 may provide notification 960 of a number of retransmissions (for autonomous retransmission) to non-serving base station 122-2.

Embodiments described herein may apply autonomous retransmission techniques to improve enhanced uplink coverage for systems (e.g., WCDMA systems providing two milliseconds TTIs). In one embodiment, for example, user equipment (UE) may receive condition information, may receive communicated information from a base station (BS), and may generate an appropriate number of retransmissions and an appropriate timing for the retransmissions based on the received information. The appropriate number of retransmissions and the appropriate timing for the retransmissions may ensure that enhanced uplink coverage is improved.

Such an arrangement may ensure that autonomous retransmission is triggered at an appropriate time and with an appropriate number of HARQ retransmissions. This may reduce unnecessary interference generated by autonomous retransmission (e.g., such as occurs when the number of autonomous retransmissions are excessively large or not necessary), may reduce packet transmission delay, and may improve cell coverage for delay sensitive services.

Embodiments described herein provide illustration and description, but are not intended to be exhaustive or to limit the implementations to the precise form disclosed. Modifications and variations arc possible in light of the above teachings, or may be acquired from practice of the implementations. For example, while series of blocks have been described with regard to FIGS. 10-16, the order of the blocks may be modified in other embodiments. Further, non-dependent blocks may be performed in parallel.

The exemplary embodiments, as described above, may be implemented in many different forms of software, firmware, and hardware in the implementations illustrated in the figures. The actual software code or specialized control hardware used to implement the exemplary embodiments described herein is not limiting of the invention. Thus, the operation and behavior of the exemplary embodiments were described without reference to the specific software code—it being understood that one would be able to design software and control hardware to implement the exemplary embodiments based on the description herein.

Further, certain portions of the invention may be implemented as "logic" that performs one or more functions. This logic may include hardware, such as an application specific integrated circuit, a field programmable gate array, a processor, or a microprocessor, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

It should be emphasized that the terms "comprises/comprising" when used in the this specification are taken to specify the presence of stated features, integers, steps, or components, but do not preclude the presence or addition of one or more other features, integers, steps, components, or groups thereof.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A device comprising:
a memory to store a plurality of instructions; and
a processing unit configured to execute instructions in the memory to:
determine whether power is limited in the device,
determine whether the device is using a minimum usable enhanced dedicated channel, E-DCH, transport format combination, ETFC,
receive consecutive negative acknowledgments, NACKs,
determine whether the number of consecutive NACKs is greater than a predefined number,
measure a downlink channel quality,
determine whether the measured downlink channel quality is less than a predefined threshold,
trigger autonomous retransmission, where a number of retransmissions are sent consecutively without waiting for receipt of a negative acknowledgement before starting the next retransmission, when power is limited in the device, when the device is using the minimum usable ETFC, and when one of:
the number of consecutive NACKs is greater than the predefined number, and
the measured downlink channel quality is less than the predefined threshold,
determine whether a difference between an estimated data signal-to-interference ratio, SIR, associated with a channel and a SIR for a transport format is greater than a certain decibel level, and
trigger autonomous retransmission when power is limited in the device, when the device is using the minimum usable ETFC, and when the difference is greater than the certain decibel level.

2. The device of claim 1, wherein the device comprises user equipment (UE).

3. The device of claim 1, wherein the processing unit further is configured to execute instructions in the memory to determine a number of retransmissions for the autonomous retransmission.

4. The device of claim 3, wherein, when determining a number of retransmissions, the processing unit further is configured to execute instructions in the memory to:

obtain a required power offset for a transport format, $P_{OFFREQ}$,
obtain an actually used power offset for the transport format, $P_{OFFUSED}$, and
calculate the number of retransmissions based on $P_{OFFREQ}$ and $P_{OFFUSED}$.

5. The device of claim 3, wherein the processing unit further is configured to execute instructions in the memory to:
receive negative acknowledgments, NACKs, and positive acknowledgements, ACKs,
increase the number of retransmissions when a certain number of consecutive NACKs are received, and
decrease the number of retransmissions when a certain number of consecutive ACKs are received.

6. The device of claim 3, wherein the processing unit further is configured to execute instructions in the memory to:
estimate a received signal-to-interference ratio, $SIR_{EST}$, associated with another device, and compare a SIR required for a transport format, $SIR_{REQ}$, and the $SIR_{EST}$ to calculate retransmission times for the autonomous retransmission.

7. The device of claim 6, wherein, when estimating a received signal-to-interference ratio, $SIR_{EST}$, the processing unit further is configured to execute instructions in the memory to:
measure a path gain to the other device via a transmission power, $P_{TX}$, of a common pilot channel, CPICH, and a received signal code power, RSCP, of the CPICH,
estimate an interference, I, at the other device, when ACKs are received, based on the path gain, the $P_{TX}$, and the $SIR_{REQ}$,
measure a new path gain,
determine the $SIR_{EST}$ based on the interference, the new path gain, and
the $P_{TX}$, and calculate the retransmission times based on the $SIR_{REQ}$ and the determined $SIR_{EST}$.

8. The device of claim 1, wherein the processing unit is further configured to execute instructions in the memory to:
generate a notification, using a very large E-DCH transport format combination indicator, E-TFCI, the notification indicating that the device is using a small E-DCH transport format indicator, ETFI, and several autonomous retransmissions, and
provide the notification to another device.

9. A method, performed by user equipment associated with a wireless environment, the method comprising the steps of:
receiving consecutive negative acknowledgments, NACKs,
measuring a downlink channel quality associated with the user equipment,
triggering autonomous retransmission, where a number of retransmissions are sent consecutively without waiting for receipt of a negative acknowledgement before starting the next retransmission, when power is limited in the user equipment, when the user equipment is using a minimum usable enhanced dedicated channel, E-DCH, transport format combination, ETFC, and when one of:
a number of consecutive NACKs is greater than a predefined number, or
the measured downlink channel quality is less than a predefined threshold;
determining whether a difference between an estimated data signal-to-interference ratio, SIR, associated with a channel and a SIR for a transport format is greater than a certain decibel level, and triggering autonomous retransmission when power is limited in the user equipment, when the user equipment is using the minimum usable ETFC, and when the difference is greater than the certain decibel level.

10. The method of claim 9, further comprising the step of determining a number of retransmissions for the autonomous retransmission.

11. The method of claim 10, further comprising the steps of:

receiving negative acknowledgments, NACKs, and positive acknowledgements, ACKs, increasing the number of retransmissions when a certain number of consecutive NACKs are received, and decreasing the number of retransmissions when a certain number of consecutive ACKs are received.

12. The method of claim 9, further comprising the steps of:

generating a notification using a very large E-DCH transport format combination indicator, E-TFCI, the notification indicating that the user equipment is using a small E-DCH transport format indicator, ETFI, and several autonomous retransmissions, and providing the notification to a base station.

13. The device of claim 1, wherein the processing unit is further configured to execute instructions in the memory to:

receive a number of retransmissions for the autonomous retransmission calculated based on a signal-to-interference ratio required for a transport format, $SIR_{REQ}$, and a signal-to-interference ratio, $SIR_{MEAS}$, associated with another device.

14. The method of claim 9, further comprising:

receiving a number of retransmissions for the autonomous retransmission calculated based on a signal-to-interference ratio required for a transport format, $SIR_{REQ}$, and a signal-to-interference ratio, $SIR_{MEAS}$, associated with another device.

* * * * *